United States Patent
Malinovskiy et al.

(10) Patent No.: US 8,567,243 B2
(45) Date of Patent: Oct. 29, 2013

(54) METHOD FOR FILL LEVEL MEASUREMENT

(75) Inventors: Alexey Malinovskiy, Maulburg (DE); Herbert Schroth, Schopfheim (DE); Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 440 days.

(21) Appl. No.: 12/735,114

(22) PCT Filed: Dec. 12, 2008

(86) PCT No.: PCT/EP2008/067370
§ 371 (c)(1),
(2), (4) Date: Jun. 17, 2010

(87) PCT Pub. No.: WO2009/077434
PCT Pub. Date: Jun. 25, 2009

(65) Prior Publication Data
US 2010/0313654 A1    Dec. 16, 2010

(30) Foreign Application Priority Data
Dec. 18, 2007   (DE) .................. 10 2007 061 574

(51) Int. Cl.
*G01F 23/26* (2006.01)
*G01S 13/08* (2006.01)
*G01S 7/40* (2006.01)

(52) U.S. Cl.
USPC ...... 73/304 C; 73/290 R; 73/304 R; 342/124; 342/174

(58) Field of Classification Search
USPC ................... 73/290 R, 291, 304 C, 306, 308; 324/642; 342/124, 174
See application file for complete search history.

(56) References Cited

U.S. PATENT DOCUMENTS

| | | | | |
|---|---|---|---|---|
| 3,424,002 A * | 1/1969 | Johnson | ................... | 73/290 R |
| 5,811,677 A * | 9/1998 | Cournane | ................. | 73/304 R |
| 5,819,582 A * | 10/1998 | Kelly | ................... | 73/290 R |
| 6,269,694 B2 * | 8/2001 | Morimoto | ................... | 73/305 |
| 6,353,407 B1 * | 3/2002 | Donnelly | ................... | 342/124 |
| 6,477,474 B2 * | 11/2002 | Diede | ................... | 702/57 |
| 6,782,328 B2 * | 8/2004 | Lovegren et al. | ................... | 702/50 |
| 6,828,930 B2 * | 12/2004 | Hagg | ................... | 342/124 |
| 7,342,531 B2 * | 3/2008 | Hagg et al. | ................... | 342/124 |
| 7,453,265 B2 * | 11/2008 | Johnstad et al. | ................... | 324/324 |

(Continued)

FOREIGN PATENT DOCUMENTS

| | | |
|---|---|---|
| CN | 1232542 A | 10/1999 |
| DE | 195 10 484 A1 | 10/1996 |

(Continued)

*Primary Examiner* — Leonard Chang
*Assistant Examiner* — Natalie Huls
(74) *Attorney, Agent, or Firm* — Bacon & Thomas, PLLC (57) ABSTRACT

A method for a fill level measurement in which a first and/or a second fill substance can be located. A rest position can be ascertained, when the entire amount of each fill substance in the container forms a single layer containing only this fill substance, wherein the first fill substance has a smaller specific weight than the second fill substance, and the two fill substances have different dielectric constants. An electromagnetic signal is sent into the container, wherein a part of the signal is reflected. A capacitance between a capacitive probe and a reference electrode is measured, dependent on the amounts of the fill substances located in the container, and, on the basis of the measured capacitance and the measured travel times for each fill substance present in the container, the rest position of its fill substance upper surface is ascertained.

9 Claims, 6 Drawing Sheets

(56) References Cited

U.S. PATENT DOCUMENTS

| | | | |
|---|---|---|---|
| 8,009,085 B2* | 8/2011 | Kuhlow et al. | 342/173 |
| 2002/0017131 A1* | 2/2002 | Neuhaus et al. | 73/304 C |
| 2004/0183718 A1* | 9/2004 | Hagg | 342/124 |
| 2009/0158839 A1* | 6/2009 | Spanke et al. | 73/290 V |

FOREIGN PATENT DOCUMENTS

| | | |
|---|---|---|
| DE | 100 37 715 A1 | 2/2002 |
| EP | 0 937 231 B1 | 8/1999 |
| EP | 1 398 605 A1 | 3/2004 |
| WO | WO 2004/083791 A1 | 9/2004 |

* cited by examiner

METHOD FOR FILL LEVEL MEASUREMENT

TECHNICAL FIELD

The invention relates to a method for fill level measurement.

BACKGROUND DISCUSSION

Fill-level measurements are currently performed in a large number of industrial applications. In the classic fill level measurement, there is located in the container a single fill substance, whose fill level is registered by means of a fill-level measuring device.

Besides that, there are a number of applications, in the case of which there is in the container not a single fill substance, but, instead, two different fill substances. When two different fill substances with different specific weights are present in a container, then that fill substance, which has the smaller specific weight, lies at equilibrium conditions on the fill substance with the greater specific weight. Two completely separated layers form. The boundary between the two fill substances is referred to as the interface.

Interfaces occur, for example, in the petrochemicals industry, where they are formed e.g. by water and hydrocarbons, e.g. oil. A further example is the foods industry, where interfaces form, for example, in fat separators.

If two different fill substances are present in the container, then so called interface measurements are performed.

Interface measurements represent a special form of fill-level measurements, and serve to determine the position of the interface in the container and/or the fill levels of the two fill substances in the container. The term, fill level, referred to the height, which a layer of a particular fill substance assumes in the container. Interface measurements are used in many fields of industrial measurements technology, in order to ascertain the amounts, especially volume and/or weight, of individual fill substances located in the container.

Interface measurements are performed with fill-level measuring devices working according to the travel time principle, examples being the products bearing the marks LEVELFLEX and MIKROPILOT of the Endress+Hauser company.

In such case, an electromagnetic signal is sent into the container. This happens e.g. in that an electromagnetic signal is radiated by means of an antenna in the form of free radiation into the container, or in that a waveguide is inserted in the container, on which the electromagnetic signal is sent in the form of guided electromagnetic waves into the container. A part of these electromagnetic signals is reflected on the fill substance upper surface of the upper fill substance. A further part of the signals penetrates the upper fill substance and is reflected on the interface between the two fill substances. The measuring device receives an echo signal formed by these reflections and ascertains therefrom, on the one hand, the travel time, which passes between the transmitting of the signal and the receipt of the echo arising by the reflection on the fill substance upper surface of the upper fill substance and, on the other hand, the travel time, which passes between the transmitting of the signal and the receipt of the echo signal arising by the reflection at the interface, or on the fill substance upper surface of the lower fill substance.

The determining of these two travel times occurs on the basis of known travel time, measuring methods. In the case of guided electromagnetic signals, for example, time domain reflectometry is used. In such case, for example, according to the method of the guided microwave, a high-frequency pulse is transmitted along a Sommerfeld waveguide, a Goubau waveguide or a coaxial waveguide. If this electromagnetic signal meets a fill substance upper surface in the container, then at least one part of the signal is reflected back due to the impedance jump existing at this media boundary. The received signal amplitude as a function of the time represents the echo signal. Each value of this echo signal corresponds to the amplitude of an echo reflected at a certain distance from the transmitting, and receiving, element. The echo signals have marked maxima, which correspond to portions of the electromagnetic signals reflected on one of the fill level upper surfaces. From the time difference between the transmitting of the electromagnetic signal and the receipt of the maxima, the sought travel time and therewith also the position of the respective fill substance upper surface in the container is ascertained.

Used in connection with electromagnetic signals radiated in the form of free radiation into the container are the frequency modulation, continuous wave radar method (FMCW method) and the pulse radar method. Both methods are known in fill level measuring technology and, consequently, not explained here in detail.

On the basis of the structural dimensions of the measuring arrangement, especially the installed height of the fill level measuring device in reference to the container, and on the basis of the propagation velocities of the electromagnetic signals in a medium, e.g. air, located above the upper fill substance, and in the upper fill substance, from these two travel times, the fill levels of the two fill substances in the container and the total fill height present in the container can be calculated.

The structural dimensions of the measuring arrangement and the propagation velocity of the electromagnetic signals in the medium located above the upper fill substance are, as a rule, known. The knowledge of the propagation velocity of the electromagnetic signals in the upper fill substance can be calculated, for example, on the basis of the dielectric constant of this fill substance, or ascertained experimentally. If the dielectric constant the upper fill substance is not known and the propagation velocity cannot, e.g. for administrative reasons, be ascertained experimentally, then no interface measurement is possible in the described manner.

Interface measurements with fill level measuring devices working according to the travel time principle deliver very good results, when the media boundaries on the upper surface of the upper fill substance and between the two fill substances are sharply defined. This is especially the case, when the fill substances in the container are resting. There are, however, a large number of applications, in the case of which the fill substances, e.g. from supplying or draining of fill substance, are never left to themselves long enough to reach equilibrium conditions, in which the two fill substances lie completely separated from one another in two layers with surfaces sharply defined relative to one another. Foam or emulsion can form in the container. While at sharply defined media boundaries, an impedance jump is present, which effects a partial reflection of the signal at such a media boundary, foam formation and/or emulsion formation lead, as a rule, to the fact that there is no narrowly localized impedance jump marked by the media boundary, but, instead, a continuous transition is present. This can in the worst case lead to the fact that the echo signal, in the case of the presence of foam and/or emulsion has only one or no marked maximum, whose travel time can be measured. If there is only one maximum, then, on the basis of the echo signal, it is no longer recognizable, whether it relates to a reflection of the signal on the fill substance upper surface of the upper or the lower fill substance. A interface measurement is in such case no longer possible.

Interface measurements can, to a limited extent, also be performed with capacitive fill level measuring devices, such as are available, for example, from the assignee. Such a method is described, for example, in the 1990 published book: FILL LEVEL MEASURING TECHNOLOGY IN THEORY AND PRACTICE, by Wlm. van de Kamp, in Section 3.6.

For this, a capacitive probe is inserted into the container and a capacitance of a capacitor formed by the probe and the container wall surrounding it measured. The measured capacitance corresponds to the sum of a base capacitance of the empty container, the product of a fill substance specific, capacitance increase factor of the upper fill substance and its fill level and the product of a fill substance specific, capacitance increase factor of the lower fill substance and its fill level.

This method is, however, only applicable, when the two fill substance specific, capacitance increase factors and the total fill height of the two fill substances present in the container are known. The latter component corresponds to the sum of the fill level of the upper and the fill level of the lower fill substance and must either be known from application-specific conditions or separately measured.

There are classical fill level measuring devices known for the measuring of a fill level of a single fill substance contained in a container, in the case of which the travel time measurement principle is combined with the capacitive measuring principle in a measuring device. An example of this is the apparatus described in German Patent, DE 100 37 715 A1 of the assignee for measuring a fill level of a single fill substance present in a container. The apparatus includes a probe, which can be operated selectively as capacitive probe of a classic capacitive fill-level measuring device as well as also as waveguide of a classic fill level measuring device working according to the travel time principle.

A further example is described in German Patent DE-A1195 10 484. This application describes a fill level measuring device working according to the travel time principle with a waveguide, in the case of which in the waveguide a metal inner conductor is provided, which serves as capacitive probe. It is indicated, that by the combination of these two measuring principles in one measuring device as regards the classical fill level measurement a redundant system is provided, in the case of which the capacitive probe is used as an overfilling preventer.

SUMMARY OF THE INVENTION

It is an object of the invention to provide a method for fill level measurement, with which in a container, in which a first and/or a second fill substance are/is located, for each fill substance present in the container a position is ascertained, which corresponds to the position, which the fill substance upper surface of the respective fill substance assumes due to the amount of the first fill substance present in the container and the amount of the second fill substance present in the container, when the entire amount of each fill substance in the container forms a single layer containing only such fill substance.

This position to be determined on the basis of the invention is especially always assumed by the fill level upper surfaces, when the fill substances in the container are at rest. The resting state referred to the state, in which each of the fill substances forms a sharply bounded layer, in which the entire amount of this fill substance is completely separated from the, in given cases, present, additional fill substance. In the resting state, there is no foam located on the fill substance upper surface and there are no emulsion layers present. The positions ascertained on the basis of the invention are in the following referred to as rest positions of the respective fill level upper surfaces.

To this end, the invention resides in a method for fill level measurement in a container, in which a quantity of a first fill substance and/or a quantity of a second fill substance are/is located, wherein the first fill substance has a smaller specific weight than the second fill substance, and the two fill substances have different dielectric constants, wherein an electromagnetic signal is sent into the container,
at at least one media boundary produced by the fill substances present in the container, a reflection takes place, in the case of which a part of the signal is reflected, and
for each reflected part, there is measured, dependent on the position of the media boundary causing the reflection, a travel time, which this part of the signal required for the path to this media boundary and back,
a capacitance between a capacitive probe and a reference electrode dependent on the amounts of the fill substances located in the container is measured, and
on the basis of the measured capacitance and the measured travel times for each fill substance present in the container, a position is ascertained, which corresponds to the position, which the fill substance upper surface of the respective fill substance assumes due to the amount of the first fill substance present in the container and the amount of the second fill substance present in the container, when the entire amount of each fill substance present in the container forms in the container a single layer containing only this fill substance.

In a further development, it is detected on the basis of these positions, whether only the first, only the second fill substance or the two fill substances are located in the container.

In a further development of the method, in the cases in which a first travel time dependent on the position of a first media boundary, a second travel time dependent on the position of a second media boundary, and the capacitance are measured, on the basis of two of these three measured variables, it is ascertained for each fill substance present in the container the position, which corresponds to the position, which the fill substance upper surface of the respective fill substance assumes due to the amount of the first fill substance present in the container and the amount of the second fill substance present in the container, when the entire amount of each fill substance present in the container forms in the container a single layer containing only this fill substance, and the results of these deductions are checked on the basis of the third measured variable.

In an additional further development of the method of the invention, in the cases, in which a first travel time dependent on the position of a first media boundary, a second travel time dependent on the position of a second media boundary, and the capacitance are measured, on the basis of the measured first travel time, the measured second travel time and the capacitance, at least one material-specific constant the first fill substance is ascertained, and the positions, which the fill level upper surfaces of the respective fill substances assume due to the amount of the first fill substance present in the container and the amount of the second fill substance present in the container, when the entire amount of each fill substance present in the container forms in the container a single layer containing only this fill substance, are ascertained on the basis of at least two of the three measured variables and the material-specific constant.

In a further development of the latter further development, the material-specific constant is a dielectric constant the first fill substance.

In a further development of the latter further development, on the basis of the dielectric constant the first fill substance, a propagation velocity of the electromagnetic signals in the first fill substance and a capacitance increase factor of the first fill substance are ascertained, wherein the capacitance increase factor gives an increase of the capacitance as a function of a fill level of the first fill substance.

In an additional further development of the method of the invention, for the case, in which only one travel time could be ascertained,
- a hypothesis therefor is created, at which media boundary the reflection decisive for the measured travel time has taken place,
- for each fill substance present in the container, on the basis of the measured travel time, the measured capacitance and the hypothesis, the position ascertained, which the fill substance upper surface of the respective fill substance assumes due to the amount of the first fill substance present in the container and the amount of the second fill substance present in the container, when the entire amount of each fill substance present in the container forms in the container a single layer containing only this fill substance,
- on the basis of the hypothesis, the positions ascertained on the basis of physical boundary conditions are checked for their correctness, and
- this method is repeated with a changed hypothesis, when the check shows a disagreement.

In an embodiment, a physical boundary condition is that the positions lie within the container.

In a preferred embodiment, the positions, which the fill level upper surfaces of the individual fill substances assume due to the amount of the first fill substance present in the container and the amount of the second fill substance present in the container, when the entire amount of each fill substance present in the container forms a single layer containing only this fill substance are given
- in the form of fill levels, which the fill substances assume in the container, or
- in the form of a distance of the respective fill substance upper surface from the container floor, or
- in the form of a distance of the respective fill substance upper surface to transmitter and receiver of the electromagnetic signal or
- in the form of a distance of the respective fill substance upper surface from a maximum allowable fill level upper boundary in the container.

In an embodiment of the method, the travel time measurements and the capacitance measurements are performed with a single fill level measuring device, which has a single probe, which serves both as capacitive probe as well as also waveguide for the electromagnetic signals.

The measuring method of the invention has the advantage, that it is applicable both for the classic fill level measurement of a fill level of a single fill substance located in the container as well as also for the interface measurement. The method detects automatically, whether located in the container are only the first, only the second or the two fill substances, and it delivers, depending on fill situation, automatically a classical fill level measurement or an interface measurement.

The fill-level measuring method of the invention has relative to a purely capacitive interface measuring method, the advantage, that it also is applicable, when the total fill height in the container is not known. The total fill height is automatically registered by the fill-level measuring method of the invention, and can be made available as a further measurement result.

A further advantage of the method of the invention is that it, independently of whether only the first, only the second or the two fill substances are located in the container, also still delivers faultless measurement results, when, with the fill-level measuring device working according to the travel time principle, only a single travel time could be measured and it is not known on which media boundary the reflection decisive for this travel time has taken place.

The invention and its advantages will now be explained in greater detail on the basis of the figures of the drawing, in which an example of an embodiment is presented; equal parts are provided in the figures with equal reference symbols. The figures of the drawing show as follows.

BRIEF DESCRIPTION OF THE DRAWINGS

DETAILED DISCUSSION IN CONJUNCTION WITH THE DRAWINGS

Figure 1:
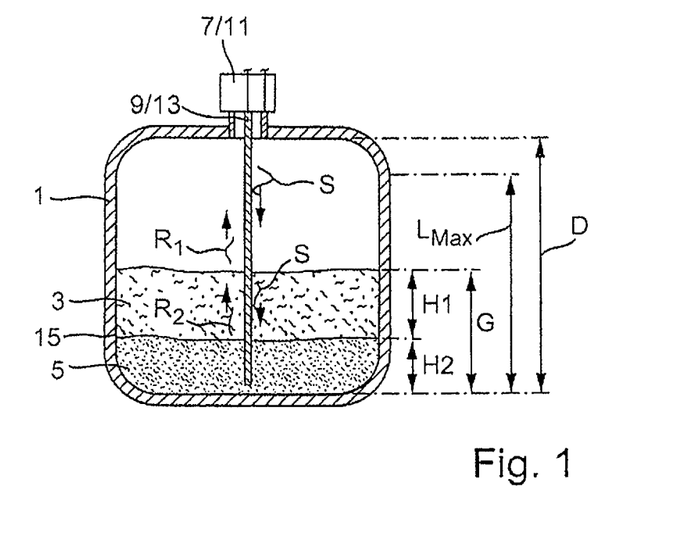
FIG. 1 is a schematic representation of a measuring arrangement having a container in which a layer of a first fill substance and a layer of a second fill substance are located.

FIG. 1 shows a schematic representation of a measuring arrangement with which the method of the invention for fill level measurement is put into practice. It includes a container 1 in which an unknown amount of a first fill substance 3 and/or an unknown amount of a second fill substance 5 can be located. If two different fill substances 3, 5 are present, then it is assumed here, that the first fill substance 3 has a smaller specific weight than the second fill substance 5. Moreover, the fill substances 3, 5 have different dielectric constants.

FIG. 1 shows a fill situation, in the case of which the two fill substances 3, 5 are at rest in the container 1. The first fill substance 3 forms in the container 1 an upper layer of fill level H1 and the second fill substance 5 a lower layer of fill level H2 located therebeneath. The first fill substance 3 is, for example, an oil, and the second fill substance 5 water. Above the first fill substance 3 is located a medium, e.g. air or a gas, in the container 1.

A fill level measuring device 7 working according to the travel time principle is provided, which serves to transmit electromagnetic signals S into the container 1. Suited for this are all fill level measuring devices already mentioned in the introduction of the description working according to the travel time principle. In the illustrated example of an embodiment, the fill level measuring device 7 is a measuring device, that includes a waveguide 9 introduced into the container 1, along which electromagnetic signals S are sent into the container 1 in the form of electromagnetic waves guided by the waveguide 9.

Additionally, a capacitive fill level measuring device 11 is provided, which serves to determine a capacitance C dependent on the amounts of the fill substances 3, 5 located in the container 1 between a capacitive probe 13 and a reference electrode 15. In the illustrated example of an embodiment, the container wall forms the reference electrode 15.

The capacitive fill-level measuring device 11 and the fill-level measuring device 7 working according to the travel time principle can be two completely separated measuring devices, which are mounted independently of one another on the container 1. Preferably, the two fill level measuring principles are, however, integrated, as here presented, in a single fill level measuring device 7/11, which has only a single probe 9/13, which serves both as capacitive probe 13 as well as also waveguide 9 for the electromagnetic signals S.

The fill-level measuring device 7 working according to the travel time principle sends electromagnetic signals S into the container 1. In such case, there occurs at at least one media boundary located in the container 1 a reflection, in the case of which a part, here R1, R2, of the signal S is reflected. These media boundaries can be formed by the fill substance upper surface of the first fill substance 3, the fill substance upper surface of the second fill substance 5 and/or a surface of an emulsion layer occurring in the container 1 by a mixing of the two fill substances 3, 5.

Figure 1A:
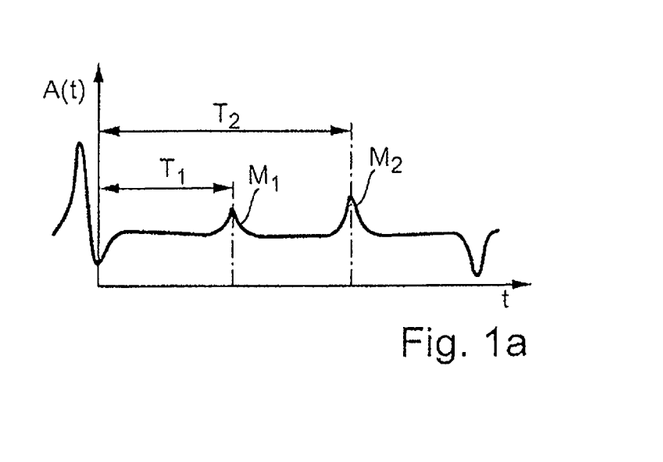
FIG. 1a is an echo signal recorded for the fill situation illustrated in FIG. 1.

In the case of the example illustrated in FIG. 1, the part R1 of these electromagnetic signals S is reflected on the fill substance upper surface of the first fill substance 3 and the part R2 of the signals on the fill substance upper surface of the second fill substance 5. The measuring device 7 receives an echo signal arising from these reflections and records an amplitude A(t) of the echo signal as a function of time t. FIG. 1a shows the amplitude A(t) of this echo signal as function of time t.

The echo signal has two marked maxima M1, M2, of which a first maximum M1 received after a travel time T1 comes from reflection on the fill substance upper surface of the first fill substance 3 and a second maximum M2 received after a travel time T2 comes from the reflection on the fill substance upper surface of the second fill substance 5.

For the travel time T1, the following relationship holds:

$$T1=2(D-H1-H2)/v_0, \quad (1)$$

whose terms are defined as follows:
- $v_0$ a propagation velocity of the electromagnetic signal in the medium located above the upper fill substance 3;
- D a distance between transmitter and receiver of the electromagnetic signal and a container floor, dependent on an installed height of the measuring device 7;
- H1 a fill level of the first fill substance; and
- H2 a fill level of the second fill substance.

The fill level H1/H2 refers, in such case, to the height of the respective fill substance 3/5 layer in the container 1 at rest. By stating the two fill levels H1, H2, the positions of the two associated fill level upper surfaces in the container 1 are uniquely defined.

Equation (1) holds also unchanged, when only the first fill substance 3 is located in the container 1, in which case the fill level H2 of the not contained, fill substance 5 amounts to zero.

For the travel time T2, the following relationship holds:

$$T2=2(D-H1-H2)/v_0+2H1/v_1 \quad (2)$$

whose terms are defined as follows:
- $v_0$ a propagation velocity of the electromagnetic signal in the medium located above the first fill substance;
- $v_1$ a propagation velocity of the electromagnetic signal in the first fill substance 3;
- D a distance between transmitter and receiver of the electromagnetic signal and a container floor, dependent on an installed height of the measuring device 7;
- H1 a fill level of the first fill substance 3; and
- H2 a fill level of the second fill substance 5.

Equation (2) holds also unchanged, when only the second fill substance 5 is located in the container 1, in which case the fill level H1 of the not contained, first fill substance 3 amounts to zero.

For the measured capacitance C, the following relationship holds:

$$C=C0+aH2+bH1 \quad (3)$$

whose new terms are defined as follows:
- C0 a basic capacitance of the empty container;
- a a capacitance increase factor dependent on the physical properties the second fill substance, and
- b a capacitance increase factor dependent on the physical properties the first fill substance.

Equation (3) holds also unchanged, when only one of the two fill substances 3 or 5 is located in the container 1 or when the container 1 is empty, in which case the fill levels H1 and/or H2 of the not contained fill substances 3 and/or 5 are/is zero.

The in the equations (1), (2) and (3) used physical constants D1 C0, $v_0$, $v_1$, a and b are, then, in so far as not explicitly stated otherwise, assumed to be known.

Here, it is assumed that the probe 9/13 reaches to the container floor. The equations hold naturally also in analogous form, when the probe reaches not quite to the container floor, in which case the reflections can naturally only be produced along the region in the container covered by the probe, and the measured capacitance can likewise be measured only along the region covered by the probe. In this case, the distance D corresponds to the distance between the installed height of the measuring device 7 and the end of the probe located in the container and the fill levels H1, H2 correspond to the heights along the probe. The method of the invention is, however, otherwise completely analogously performable.

According to the invention, an electromagnetic signal in the container 1 is sent by means of the fill-level measuring device 7 working according to the travel time principle. For performing the method, it is required, that on at least one media boundary produced by the fill substances 3 and/or 5 present in the container 1, a reflection takes place, in the case of which a part Rx, Ry of the signal S is reflected and a travel time Tx, Ty, which this part Rx, Ry of the signal S requires for the path to this media boundary and back, is measured, as dependent on the position of the media boundary causing the reflection. In parallel therewith, there is measured with the capacitive fill-level measuring device 11 the capacitance C dependent on the amounts of the fill substances 3, 5 located in the container 1.

Then, on the basis of the measured capacitance C and the measured travel times Tx and/or Ty for each fill substance 3, 5 present in the container 1, rest positions are ascertained. The rest position refers to the position, which corresponds to the position, which the fill substance upper surface of the respective fill substance 3, 5 assumes due to the amount of the first fill substance 3 present in the container 1 and the amount of the second fill substance 5 present in the container 1, when the entire amount of each fill substance 3, 5 in the container 1 forms a single layer containing the entire amount of this fill substance 3, 5.

If the container 1, as shown in FIG. 1, is filled with the two fill substances 3 and 5, then the fill-level measuring device delivers in the ideal case two travel times Tx and Ty. Since both foam as well as also emulsion, as a rule, make a travel-time measurement impossible, two travel times are typically only measured, when the two fill substances 3, 5 are present in the container 1, and, as presented in FIG. 1, are at rest.

It is now established, which is the shorter of the two travel times Tx and Ty. According to the invention, in this case, the shorter travel time, here Tx, with Tx<Ty, is associated with a reflection on the fill substance upper surface of the upper, first fill substance 3, and the longer travel time, here Ty, with Ty>Tx, is associated with a reflection on the fill substance upper surface of the lower fill substance 5. Accordingly, Tx=T1 and Ty=T2. The fill levels H1 and H2 can now be calculated on the basis of the three equations (1), (2) and (3).

In such case, the three equations (1), (2) and (3) form for determining the two unknown fill level H1 and H2 an overdetermined system of equations. Preferably, in this case, one proceeds in such a manner that the fill levels H1 and H2 are derived on the basis of two of the three measured variables T1, T2, C, and the results are checked on the basis of the third measured variable.

For example, the following expressions are obtained for the fill levels H1 and H2 on the basis of the two travel times T1 and T2 by applying equations (1) and (2):

$$H1=(T2-T1)0.5v_1 \quad (4)$$

and $$H2=D-T1\ 0.5v_0-(T2-T1)0.5v_1. \quad (5)$$

On the basis of the fill levels H1 and H2 derived in this way, now, by insertion of the results in Equation (3), an associated capacitance C can be calculated, and compared with the measured capacitance C. This enables checking the measurement results for H1 and H2 on the basis of the capacitance C measured independently thereof.

Alternatively, in this case, on the basis of the measured, first travel time Tx=T1, the measured, second travel time Ty=T2 and the measured capacitance C, at least one material-specific constant the upper fill substance 3 can be ascertained. The material-specific constant is, for example, the propagation velocity $v_1$ of the electromagnetic signal S in the first fill substance 3 or the capacitance increase factor b for the first fill substance 3, in which case the position of the upper surface of the first fill substance 3 and the position of the upper surface of the second fill substance 5 can be ascertained on the basis of the three measured variables T1, T2 and C and the ascertained material-specific constant. The material-specific constant need, in this case, not be earlier known.

Preferably, the material-specific constant is the dielectric constant $\in$ of the first fill substance 3. In such case, the physical fact is utilized, that both the propagation velocity $v_1$ of the electromagnetic signal S in the first fill substance 3 as well as also the capacitance increase factor b for the first fill substance 3 are determined by the dielectric constant $\in$ of the first fill substance 3. Both the propagation velocity $v_1$ as well as also the capacitance increase, factor b can be expressed and calculated in the form of physical formulas $v_1=f(\in)$ and $b=g(\in)$ composed on the basis of the physical conditions present for the measuring as a function of the dielectric constant $\in$.

Thus, the following relationship holds approximately for the propagation velocity of electromagnetic signals in a fill substance: $v_1=K1\in^{-1/2}$, wherein K1 is a constant derivable by formula from the physical conditions or measurable experimentally. For the capacitance increase factor of a cylindrical capacitor, the following relationship holds: $b \approx K2 \in$, wherein K2 is a constant calculable on the basis of the geometry and the dimensions of the cylindrical capacitor or experimentally determinable.

Through the insertion of the physical formulas $v_1=f(\in)$ and $b=g(\in)$ for the propagation velocity $v_1$ and the capacitance increase factor b into the equations (2) and (3), now, with the equations (1), (2) and (3), a system of equations with three equations (1), (2), (3) and three unknowns, H1, H2, $\in$, is available, with which all three unknowns can be iteratively calculated. In this case, the positions of the two fill level upper surfaces can also be ascertained with the method of the invention, when it is not known, which fill substances 3, 5 are located in the container 1.

Figure 2:
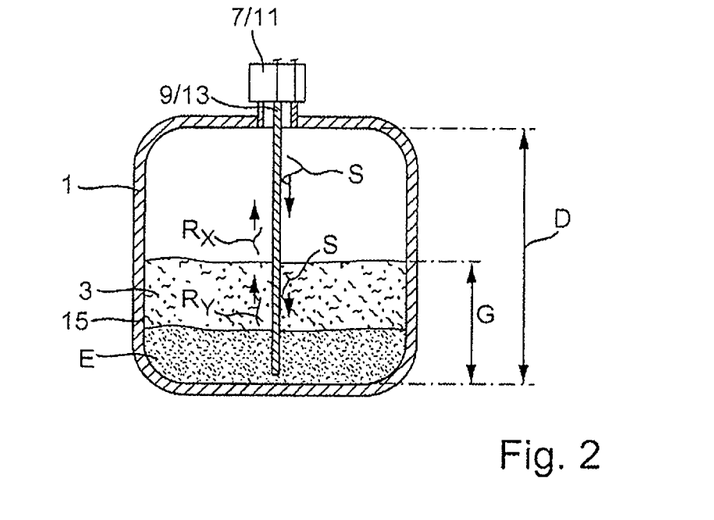
FIG. 2 shows the measuring arrangement of FIG. 1, wherein in the container an emulsion layer is located, on which a layer of the first fill substance lies.
Figure 2A:
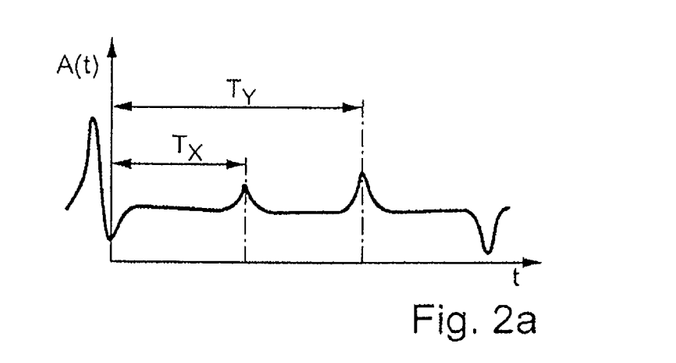
FIG. 2a shows a record for the fill situation illustrated in FIG. 2, an echo signal, which arises, when the electromagnetic signal is reflected on the fill substance upper surface of the first fill substance and on the upper surface of the emulsion.
Figure 3:
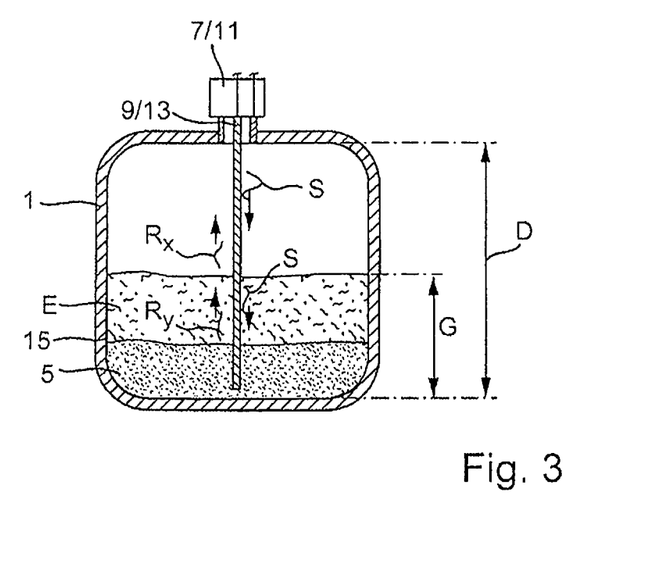
FIG. 3 shows the measuring arrangement of FIG. 1, wherein in the container a layer of the second fill substance is located, on which an emulsion layer is located.
Figure 3A:
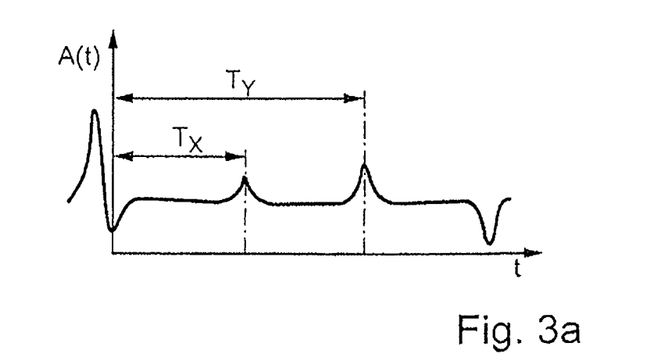
FIG. 3a shows a record for the fill situation illustrated in FIG. 3, an echo signal, which arises, when the electromagnetic signal is reflected on the fill substance upper surface of the second fill substance and on the upper surface of the emulsion.

There are a few exceptional cases, in the case of which also two travel times Tx, Ty can be measured, when two fill substances 3, 5 are located in the container 1, however, no resting state is present. This is the case, when the fill substances 3, 5 form emulsions with very good reflection characteristics and such an emulsion layer E is located, as shown in FIG. 2, in the container 1 under a layer exclusively of the first fill substance 3 or when such an emulsion layer E is located, as shown in FIG. 3, on a layer exclusively of the second fill substance 5. FIGS. 2a and 3a show the associated echo signals A(t). In these cases, the sought positions, which the fill level upper surfaces assume in the resting state, are preferably ascertained on the basis of Equation (1) and Equation (3). In such case, it is assumed, that the shorter of the two travel times Tx originates from the reflection on the fill substance upper surface of the first fill substance 3. Entered in Equation (1) is only the entire fill height G=H1+H2, which the two fill substances 3, 5 provide together in the container 1. The entire fill height G is, however, independent on whether the fill substances 3, 5 are arranged in separated layers in the container, or were completely or partially mixed to an emulsion. The same is true for the measured capacitance C. It is exclusively dependent on the amounts of the two fill substances 3, 5 present in the container 1. It is, however, completely independent of whether the fill substances 3, 5 are present in separated layers or completely or partially mixed. Insertion of the measured capacitance C and the shorter travel time Tx as T1 into the equations (1) and (3) delivers a system of equations for determining H1 and H2. The fill levels H1, H2 calculated in this way correspond to the fill levels that these fill substances 3, 5 would actually assume at rest in the container 1, after the emulsion layer E had separated into its components and the fill substance upper surfaces had assumed their rest positions.

There are, however, also a large number of applications, in the case of which only a single travel time Tx can be measured with the fill-level measuring device 7 working according to the travel time principle.

This is e.g. the case, when only the first fill substance 3 or only the second fill substance 5 is located in the container 1, or when the two fill substances 3, 5 are mixed in such a manner, that a single emulsion layer E is located in the container 1. These three fill situations, as well as the associated echo signals are presented in FIGS. 4 and 4*a*.

Figure 5:
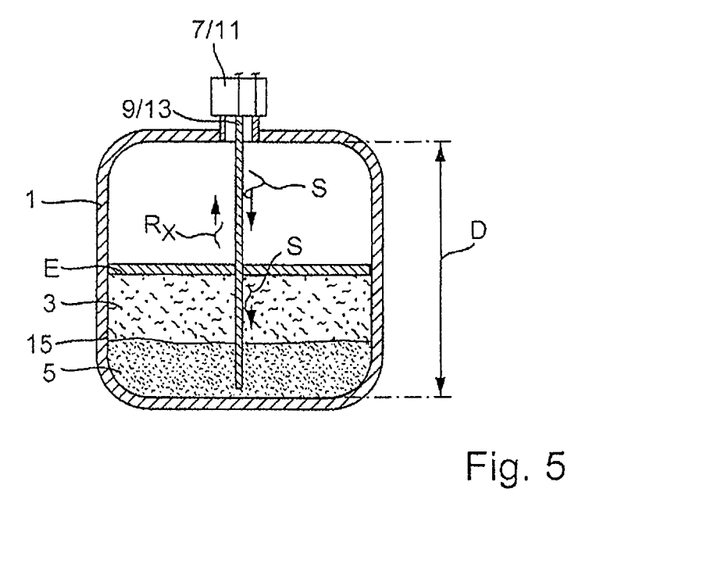
FIG. 5 shows the measuring arrangement of FIG. 1, wherein in the container a layer of the second fill substance, a layer of the first fill substance and foam are located.
Figure 5A:
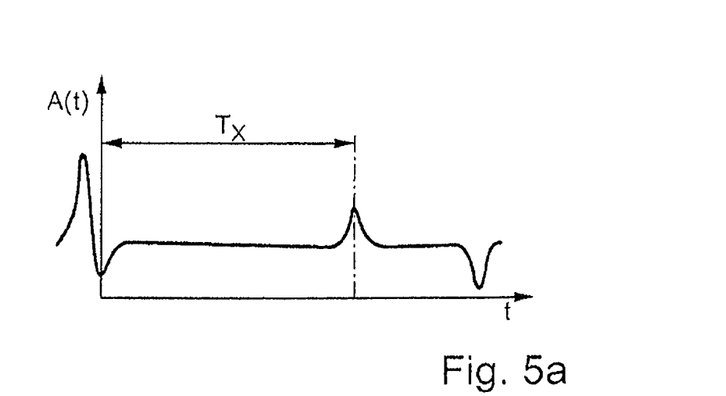
FIG. 5a shows an echo signal recorded for the fill situation illustrated in FIG. 5.

It is also the case, when the first and the second fill substances 3, 5 are located in the container 1, and foam has formed on the upper surface of the first fill substance 3. This fill situation, as well as the associated echo signal, are presented in FIGS. 5 and 5*a*. The foam is drawn cross-hatched in FIG. 5, and worsens the reflection characteristics on this surface in such a manner, that, as a rule, no echo caused by a reflection on this media boundary can any longer be identified and accordingly no travel-time measurement can be performed for this.

Figure 6:
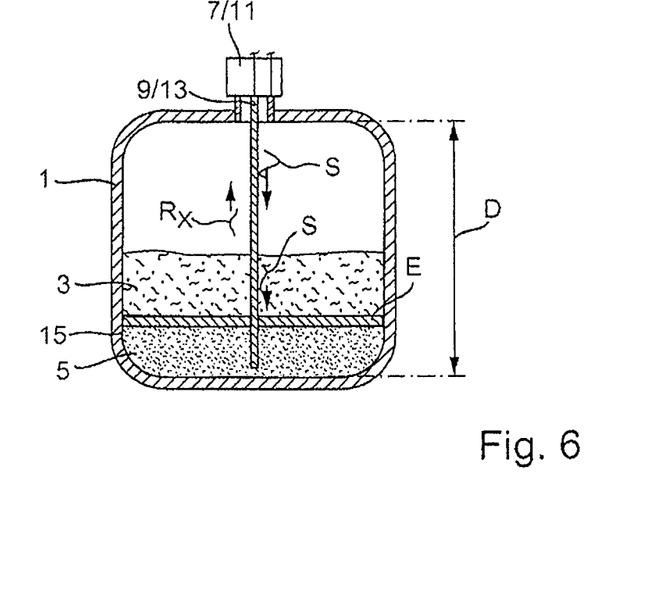
FIG. 6 shows the measuring arrangement of FIG. 1, wherein in the container a layer of the second fill substance, a layer of the first fill substance and an emulsion layer arranged between the two layers are located.
Figure 6A:
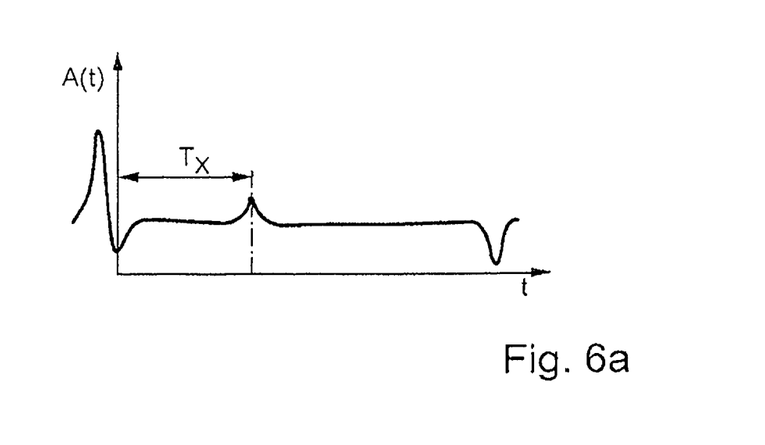
FIG. 6a is an echo signal recorded for the fill situation illustrated in FIG. 6.

It is, furthermore, the case, when the first and the second fill substances 3,5 are located in the container 1, and between the two fill substances 3, 5 an emulsion layer E has formed, which leads to the fact that in this region no marked reflection takes place. This fill situation, as well as the associated echo signal, are presented in FIGS. 6 and 6*a*. Also here, as a rule, no maximum caused by a reflection in the region of the emulsion layer E can any longer be identified and, accordingly, no travel-time measurement can be performed for this.

Figure 2B:
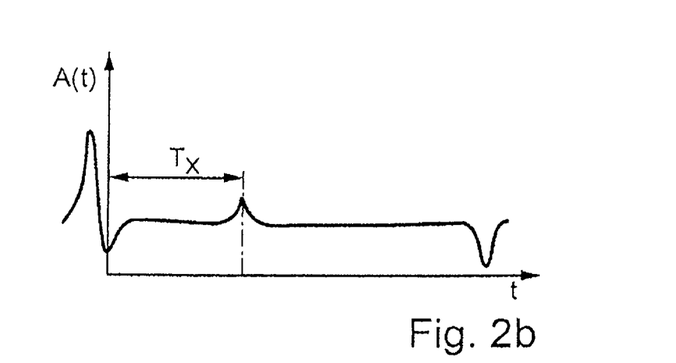
FIG. 2b shows a record for the fill situation illustrated in FIG. 2, an echo signal, which arises, when the electromagnetic signal is reflected exclusively on the fill substance upper surface of the first fill substance.
Figure 3B:
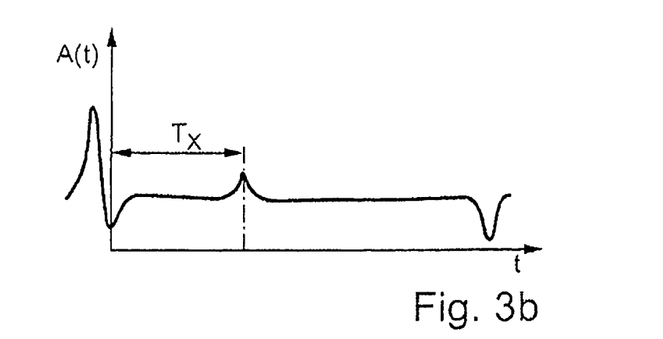
FIG. 3b shows a record for the fill situation illustrated in FIG. 3, an echo signal, which arises, when the electromagnetic signal is reflected exclusively on the upper surface of the emulsion.

A further case arises when on the lower, second fill substance 5 exclusively an emulsion layer E formed by a mixing of the two fill substances 3 and 5 is located. This fill situation is already shown in FIG. 3. Conversely, also below in the container 1 an emulsion layer formed by a mixing of the two fill substances 3 and 5 can be located, on which a layer exclusively of the first fill substance 3 lies. This fill situation is shown in FIG. 2. In both cases, there occurs, as a rule, on the media boundary between the emulsion E and the thereto neighboring fill substance, fill substance 3 in FIG. 2 and fill substance 5 in FIG. 3, no marked reflection, which would enable a travel-time measurement. The corresponding curve of the echo function is presented in FIGS. 2*b* and 3*b*.

In all cases, in which only one travel time Tx and the capacitance C can be measured, first a hypothesis is created, which states on which fill substance upper surface located in the container 1 the reflection decisive for the measured travel time Tx has occurred. The hypothesis can either read: 'The reflection has taken place on the fill substance upper surface of the first fill substance 3', or it can read: 'The reflection has taken place on the fill substance upper surface of the second fill substance 5'.

In a next step, on the basis of this hypothesis, for each fill substance 3, 5 present in the container 1, the rest position of its fill substance upper surface is ascertained, which it assumes, when the fill substances 3, 5 are at rest, and neither foam nor emulsion is located in the container 1. This is done on the basis of the three above cited equations (1), (2) and (3).

In such case, it is preferably assumed as first hypothesis, that the measured travel time Tx corresponds to the first travel time T1, which originates from a reflection on the fill substance upper surface of the first fill substance 3. Correspondingly, on the basis of Equations (1) and (3), the fill level H1 of the first fill substance 3 and the fill level H2 of the second fill substance 5 are calculated. For this, the following relationships hold for the hypothesis Tx=T1:

$$H1=(C-C0-a(D-0.5v_0Tx))/(b-a),$$

$$H2=(C-C0-b(D-0.5v_0Tx))/(a-b).$$

In Equation (1) enters only the entire fill height G=H1+H2, which the two fill substances 3, 5 assume together in the container 1. The entire fill height G is, however, independent of whether the fill substances 3, 5 are arranged in separated layers in the container 1, or completely or partially mixed to an emulsion E. The same holds for the measured capacitance C. It is exclusively dependent on the amounts of the two fill substances 3, 5 present in the container 1. It is, however, completely independent of whether the fill substances 3, 5 are present in separated layers or completely or partially mixed. Insertion of the measured capacitance C and the shorter travel time Tx as T1 established on the basis of the hypothesis in above equations delivers, thus, the fill levels H1, H2, which these fill substances 3, 5 would assume at rest in the container 1, after the emulsion layer E has separated into its components.

The correctness of the calculated positions is checked on the basis of physical boundary conditions.

In such case, it is especially checked, whether the positions of the fill level upper surfaces ascertained with the hypothesis lie within the container 1. For this, each fill level, H1 and H2, must be greater than, or equal to, zero, and the sum of the two fill levels, H1+H2, must be less than the distance D between transmitter and receiver of the electromagnetic signal S and the container floor, as dependent on an installed height of the measuring device 7. The fill level H1 must even, in fact, be greater than zero, in order that the hypothesis, that the reflection decisive for the travel time Tx occurred on the fill substance upper surface of the first fill substance 3, can be confirmed.

If the fill levels H1 and H2 ascertained in this way fulfill the physical boundary conditions, then the hypothesis is confirmed as correct and the two fill levels H1, H2 form of the measurement result achieved with the method. On the basis of the fill levels H1, H2, the rest positions can be given in any desired form. The positions can be output, for example, directly in the form of the fill levels H1 and H2. They can be given in the form of separations of the respective fill substance upper surfaces from the container floor (D2=H2; D1=H1+H2) or in the form of a distance of the respective fill substance upper surfaces to transmitter and receiver of the electromagnetic signal S (D1=D−H1−H2; D2=D−H1). Alternatively, they can, however, also be given in the form of a distance of the respective fill substance upper surfaces from a maximum allowable fill level upper boundary $L_{max}$ (D1=$L_{max}$−H1−H2; D2−$L_{max}$−H1) are. To the extent that the probe does not reach to the container floor, the distance between the container floor and the end of the probe located in the container 1 is to be taken into consideration as an additive variable.

If the hypothesis is confirmed as correct, then there exists in the container 1 one of the two following states:

State 1: H1>0 and H2=0.

In the container 1 there is located exclusively the first fill substance 3. On the basis of the method of the invention, in this case, the position of the fill substance upper surface of the first fill substance 3 is ascertained and it is established that the second fill substance 5 is not present in the container 1.

State 2: H1>0 and H2>0.

Located In the container 1 are the first and the second fill substances 3, 5. In this case, it can be, that in the container 1 an emulsion layer E has formed, which was caused by a mixing of the two fill substances 3, 5 in a limited region in which the two fill substances 3, 5 meet one another (see FIG. 6). Likewise it can be, that a layer of the first fill substance 3 is floating on a emulsion layer of the two fill substances 3, 5 (see FIG. 2) or an emulsion layer E is floating on a layer of the second fill substance 5 (see FIG. 3). Likewise, however, also an emulsion layer E can have formed, which extends over the entire given total fill height G=H1+H2 by the sum of the two fill levels H1, H2 (see FIG. 4). Height and position of the aforementioned emulsion layers cannot be ascertained with the method of the invention.

If the first hypothesis could not be confirmed on the basis of the boundary conditions, then the method is repeated with the second hypothesis. In such case, in order to remain with the aforementioned example, it is now assumed as hypothesis, that the measured travel time Tx corresponds to the second travel time T2, which comes from a reflection on the fill substance upper surface of the second fill substance 5. With this hypothesis, on the basis of Equation (2) and (3), the fill level H1 of the first fill substance 3 and the fill level H2 of the second fill substance 5 are calculated. For this, the following relationships hold for the hypothesis Tx=T2:

$$H1=(C-C0-a(D-0.5v_0Tx))/(b-a(1-v_0/v_1)),$$

$$H2=((C-C0)(1-v_0/v_1)-b(D-0.5v_0Tx))/(a(1-v_0/v_1)-b).$$

Also here, the correctness of the hypothesis is checked by considering the calculationally ascertained positions in view of physical boundary conditions.

In such case, it is especially checked, whether the positions of the fill level upper surfaces ascertained with the hypothesis lie within the container 1. For this, each fill level, H1 and H2, must be greater than or equal to zero and the sum of the two fill levels, H1+H2, must be less than the distance D between source and receiver of the electromagnetic signal S and the container floor, as dependent on an installed height of the measuring device 7. The fill level H2 must even, in fact, be greater than zero, in order that the hypothesis, that the reflection decisive for the travel time Tx occurs on the fill substance upper surface of the second fill substance 5, can be confirmed.

If the fill levels H1 and H2 ascertained in this way fulfill the physical boundary conditions, then the hypothesis is confirmed as correct and the two fill levels, H1, H2, represent the measurement result of the method, on the basis of which the rest positions of the fill level upper surfaces of the fill substances 3 present in the container 1 can be given in any desired form. The positions can, for example, be output directly in the form of the fill levels H1 and H2. They can be given in the form of a distance of the respective fill substance upper surfaces from the container floor (D2=H2; D1=H1+H2) or in the form of a distance of the respective fill substance upper surfaces to transmitter and receiver of the electromagnetic signal (D1=D−H1−H2; D2=D−H1). Alternatively, they can, however, also be given in the form of a distance of the respective fill substance upper surfaces from a maximum allowable fill level, upper boundary $L_{max}$ (D1=$L_{max}$−H1−H2; D2=$L_{max}$−H1). To the extent that the probe does not quite reach to the container floor, also here, the distance between the end of the probe located in the container and the container floor is to be taken into consideration as an additive variable.

If the hypothesis is confirmed as correct, then the result corresponds to one of the two following fill states in the container 1:

Fill state 1: H2>0 and H1=0.

Figure 4:
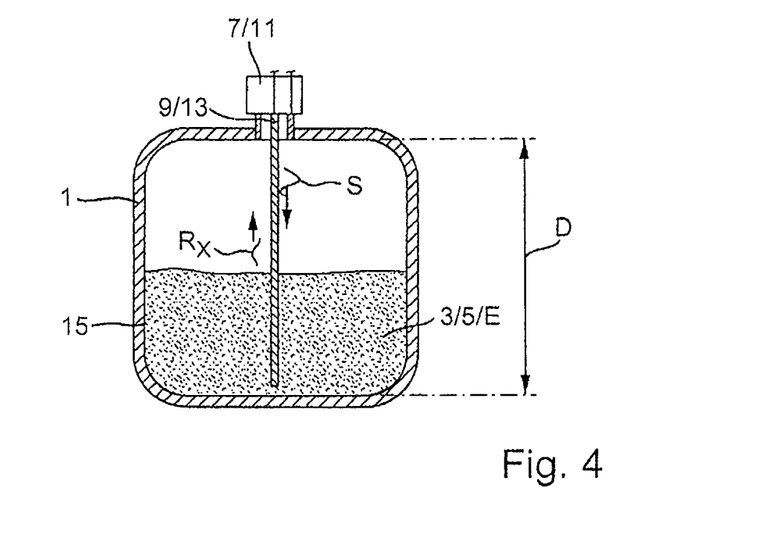
FIG. 4 shows the measuring arrangement of FIG. 1, wherein in the container only the first fill substance, only the second fill substance or exclusively an emulsion layer is located.
Figure 4A:
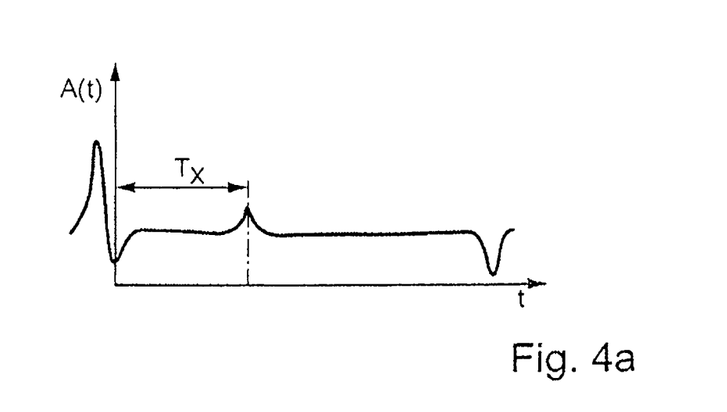
FIG. 4a shows an echo signal recorded for the fill situation illustrated in FIG. 4.

Located in the container 1 is exclusively the second fill substance 5 (see FIG. 4). On the basis of the method of the invention, in this case, the rest position of the fill substance upper surface of the second fill substance 5 is ascertained and it is established that the first fill substance 3 is not present in the container 1.

Fill state 2: H1>0 and H2>0.

Located in the container 1 are the first and the second fill substances 3, 5.

In this case, it can be, that in the container 1 foam has formed on the first fill substance 3, which leads to the fact that on the upper surface of the first fill substance 3 no measurable reflection has occurred. Foam, it is true, prevents, the reflection; it leads, however, as a rule, not to a marked change of the fill level of the upper fill substance relative to its fill level H1 in the rest position. The two fill levels H1 and H2 ascertained with the method of the invention give thus also, in this case, the fill levels of the two fill substances 3, 5 at rest conditions, in which foam is no longer present.

Theoretically, it would also be thinkable, that the case shown in FIG. 3 is present, in the case of which through a mixing of the two fill substances 3, 5 an emulsion layer has formed, which lies on a layer exclusively of the second fill substance in the container 1. This would be the case, when exclusively the travel time of a signal reflected on the fill substance upper surface of the lower fill substance 5 would have been measured; in practice, however, the impedance jump between the medium located above the fill substances 3, 5 in the container 1 and the emulsion E is very much higher than the impedance jump that occurs at the transition of the emulsion E to the second fill substance 5. When the travel time of the signal reflected on the fill substance upper surface of the lower fill substance 5 can be measured, then naturally also the travel time of the signal reflected on the upper surface of the emulsion layer E will be measured. In connection with two measured travel times, this case has already been described above.

Additionally to the described cases, in which always at least one fill substance 3, 5 is located in the container 1, naturally also the presence of an empty container 1 can be recognized with the described fill level measuring device 7/11. This is always the case, when the measured capacitance C equals the basic capacitance C0, and no travel time attributable to a reflection on a media boundary located within the container 1, above the container floor, could be measured.

LIST OF REFERENCE CHARACTERS 1 container
3 first fill substance
5 second fill substance
7 fill level measuring device working according to the travel time principle
9 waveguide
11 capacitive fill-level measuring device
13 capacitive probe
15 reference electrode

The invention claimed is:

1. A method for the fill level measurement in a container, in which a quantity of a first fill substance and/or a quantity of a second fill substance are/is located, wherein the first fill substance has a smaller specific weight than the second fill substance, and the two fill substances have different dielectric constants, wherein the method comprising the steps of:
sending an electromagnetic signal into the container;
on at least one media boundary produced by the fill substances present in the container, a reflection takes place, in the case of which a part of the signal is reflected;
measuring the travel time required for the path to such media boundary and back, for each reflected part of the signal, dependent on the position of the media boundary causing the reflection;
measuring a capacitance between a capacitive probe and a reference electrode, dependent on the amounts of fill substances located in the container;
ascertaining a position on the basis of the measured capacitance and the measured travel times for each fill substance present in the container, which corresponds to the position, which the fill substance upper surface of the respective fill substances assume due to the amount of the first fill substance present in the container and the amount of the second fill substance present in the container, when the entire amount of each fill substance in the container forms a single layer containing only such fill substance;
creating a hypothesis for which media boundary the reflection decisive for the measured travel time has taken place for the case in which only one travel time could be ascertained;
ascertaining on the basis of the easured travel time, for each fill substance present in the container, the measured capacitance and the hypothesis, the positions, which the fill substance upper surfaces of the respective fill substances assume due to the amount of the first fill substance present in the container and the amount of the second fill substance present in the container, when the entire amount of each fill substance in the container forms a single layer containing only such fill substance;
checking for correctness the positions ascertained on the basis of the hypothesis and on the basis of the physical boundary conditions; and
repeating the method with a changed hypothesis, in the case the check shows a disagreement.

2. The method for the fill level measurement as claimed in claim 1, wherein:
establishing on the basis of such positions, whether only the first fill substance, only the second fill substance or the two fill substances are located in the container.

3. The method for fill level measurement as claimed in claim 1, wherein:
a first travel time dependent on the position of a first media boundary is measured;
a second travel time dependent on the position of a second media boundary and capacitance is measured; and
on the basis of two of these three measured variables, there is ascertained for each fill substance present in the container a position, which corresponds to the position, which the fill substance upper surface of the respective fill substance assumes due to the amount of the first fill substance present in the container and the amount of the second fill substance present in the container, when the entire amount of each fill substance in the container forms a single layer containing only this fill substance; and
the results of these deductions are checked on the basis of the third measured variable.

4. The method for fill level measurement as claimed in claim 1, wherein:
measuring a first travel time dependent on the position of a first media boundary;
measuring a second travel time dependent on the position of a second media boundary, and capacitance;
ascertaining on the basis of the measured first travel time, the measured second travel time and the capacitance, at least one material-specific constant of the first fill substance; and
the positions, which the fill substance upper surfaces of the respective fill substance assume due to the amount of the first fill substance present in the container and the amount of the second fill substance present in the container, when the entire amount of each fill substance in the container forms a single layer containing only this fill substance, are ascertained on the basis of at least two of the three measured variables and the material-specific constant.

5. The method for fill level measurement as claimed in claim 4, wherein:
the material-specific constant is a dielectric constant of the first fill substance.

6. The method for fill level measurement as claimed in claim 5, wherein:
ascertaining on the basis of the dielectric constant of the first fill substance a propagation velocity of the electromagnetic signals in the first fill substance and a capacitance increase factor of the first fill substance; and
the capacitance increase factor represents an increase of the capacitance as a function of a fill level of the first fill substance.

7. The method for fill level measurement as claimed in claim 1, wherein:
a physical boundary condition is that the positions lie within the container.

8. The method for fill level measurement as claimed in claim 1, wherein:
the positions, which the fill substance upper surface of the individual fill substances assume due to the amount of the first fill substance present in the container and the amount of the second fill substance present in the container, when the entire amount of each fill substance present in the container forms a single layer containing only this fill substance, are ascertained in the form of fill levels, which the fill substances assume in the container, or in the form of distances of the respective fill substance upper surfaces from the container floor, or are given in the form of distances of the respective fill substance upper surfaces to the transmitter and receiver of the electromagnetic signal, or in the form of distances between the respective fill substance upper surfaces to a maximum allowable fill level, upper boundary in the container.

9. The method for fill level measurement as claimed in claim 1, wherein:
the travel time measurements and the capacitance measurements are performed with a single fill level measuring device, which has a single probe, which serves both as capacitive probe as well as also waveguide for the electromagnetic signals.

* * * * *